US009788399B1

United States Patent
Oxborrow et al.

(10) Patent No.: US 9,788,399 B1
(45) Date of Patent: Oct. 10, 2017

(54) SYSTEM AND METHOD FOR FLIGHT DECK LASER FLASH MITIGATION

(71) Applicant: The Boeing Company, Chicago, IL (US)

(72) Inventors: Robert R. Oxborrow, Kent, WA (US); Alvin L. Sipe, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/184,423

(22) Filed: Jun. 16, 2016

(51) Int. Cl.
  *B60Q 1/14*   (2006.01)
  *H05B 37/02*  (2006.01)
  *B64D 47/02*  (2006.01)
  *B64D 43/00*  (2006.01)

(52) U.S. Cl.
  CPC ........... *H05B 37/029* (2013.01); *B64D 43/00* (2013.01); *B64D 47/02* (2013.01)

(58) Field of Classification Search
  CPC ....... H05B 37/029; B64D 43/00; B64D 47/02
  USPC .......................................................... 315/77
  See application file for complete search history.

(56) References Cited

U.S. PATENT DOCUMENTS

2008/0218431 A1* 9/2008 Schmidt .............. G06F 21/6245
                                                          345/1.1
2014/0192367 A1* 7/2014 Jungwirth ............... G01S 7/495
                                                          356/614

OTHER PUBLICATIONS

"What makes laser pointers hazardous to aviation"—www.laserpointersafety.com, retrieved Jun. 14, 2016.
Derenksi, Peter A., "Reducing the Threat of Laser Illuminations," Boeing Aeromagazine, Issue 37, First Quarter, 2010.
Nakagawara, Van B. et al., "A Review of Recent Laser Illumination Events in the Aviation Environment," Final Report, Oct. 2006, Federal Aviation Administration, Aerospace Medicine Technical Reports.

* cited by examiner

*Primary Examiner* — Daniel D Chang
(74) *Attorney, Agent, or Firm* — Economou Silfin LLP; John S. Economou

(57) ABSTRACT

A system and method is described for minimizing the effects of a laser light flash in a cockpit area of an aircraft. At least one sensor is configured to detect a laser light flash of a predetermined color. At least one light source is mounted in the cockpit area and configured to output light of the predetermined color upon activation. Finally, a controller is coupled to the at least one sensor, the at least one light source, and a cockpit ambient light control circuit. The cockpit ambient light control circuit is configured to control an intensity output of cockpit ambient lighting. The controller is configured to activate the at least one light source and to cause the cockpit ambient light control circuit to turn off or dim the intensity output of the cockpit ambient lighting upon detection of a laser light flash of the predetermined color.

20 Claims, 2 Drawing Sheets

SYSTEM AND METHOD FOR FLIGHT DECK LASER FLASH MITIGATION

FIELD

This disclosure relates generally to a system and method for the mitigation of a laser flash on an aircraft flight deck.

BACKGROUND

There has been a significant increase in the number of incidents involving laser light directed at aircraft in flight over the past twenty-five years. When laser light is directed into the flight deck (cockpit) area of an aircraft, there can be four resulting hazards. First, the laser light may cause permanent eye damage to the retina of a crewmember (e.g., a pilot or copilot) on the flight deck, and possibly disrupt flight operations based on the harm caused to the crewmember. However, this is seen as the least significant hazard, because such damage would require the laser to directly enter the eye, which is extremely difficult given the motion of the aircraft, distance between the laser and the aircraft, etc. Second, the laser light may cause temporary flash blindness to a crewmember such that there is a loss of night vision, leaving the crewmember blinded until the effects subside. Third, the laser light may cause glare on the flight deck that prevents the crewmember from seeing through the windshield until the laser light ceases. Fourth, the laser light may cause a distraction to the crewmember, since laser light is significantly brighter than other nighttime external light sources. Studies have found that temporary flash blindness, glare, and distraction are by far statistically the greater problem for pilots than a risk of eye damage. Temporary flash blindness, glare, and distraction can disorient crewmembers on the flight deck.

Research is currently being conducted into systems and methods which mitigate flight deck laser illumination by blocking the laser light from entering the flight deck, e.g., by the use of various frequency filters applied to windshield or by requiring crewmembers to wear special eyeglasses. These solutions can be expensive and limited in effectiveness, and the special glasses must be worn prior to initiation of a laser illumination event to be most effective.

Accordingly, there is a need for a system and method for the mitigation of a laser flash on an aircraft flight deck which overcomes the problems recited above.

SUMMARY

In a first aspect, a system for minimizing effects of a laser light flash in a cockpit area of an aircraft is provided. The system includes at least one sensor configured to detect a laser light flash of a predetermined color. The system also includes at least one light source mounted in the cockpit area and configured to output light of the predetermined color upon activation. Finally, the system includes a controller coupled to the at least one sensor, the at least one light source, and a cockpit ambient light control circuit. The cockpit ambient light control circuit is configured to control an intensity output of cockpit ambient lighting. The controller is configured to activate the at least one light source and to cause the cockpit ambient light control circuit to turn off or dim the intensity output of the cockpit ambient lighting upon detection of a laser light flash of the predetermined color.

The controller may further be configured to deactivate the at least one light source and to return the cockpit ambient lighting to a normal level after a predetermined period of time following the detection of the laser light flash by the at least one sensor. The cockpit area of the aircraft may include at least one flight deck instrument having a backlighting element operating at an initial intensity output level and the controller may also be coupled to a flight deck instrument backlight element control circuit and be configured to cause each backlighting element to operate at an increased intensity output level upon the detection of the laser light flash of the predetermined color. The controller may further be configured to cause each backlighting element to return to the initial intensity output level after a predetermined period of time after the detection of the laser light flash of the predetermined color. The predetermined color may be green. The intensity output of cockpit ambient lighting may have an initial output intensity level, and the controller may further be configured to dim the intensity output of the cockpit ambient lighting by causing the intensity output of the cockpit ambient lighting to be a fraction of the initial output intensity level. The fraction may be one-fifth. Each of the at least one sensors may be mounted adjacent to cockpit windscreens in the aircraft.

In a second aspect, a system for minimizing effects of a laser light flash in a cockpit area of an aircraft is provided. The system includes at least one first sensor configured to detect a laser light flash of a first predetermined color and at least one second sensor configured to detect a laser light flash of a second predetermined color. The system also includes at least one first light source mounted in the cockpit area and configured to output light of the first predetermined color upon activation and at least one second light source mounted in the cockpit area and configured to output light of the second predetermined color upon activation. The system further includes a controller coupled to the at least one first sensor, the at least one second sensor, the at least one first light source and the at least one second light source, and a cockpit ambient light control circuit. The cockpit ambient light control circuit is configured to control an intensity output of cockpit ambient lighting. The controller is configured to activate the at least one first light source and to cause the cockpit ambient light control circuit to turn off or dim the intensity output of the cockpit ambient lighting upon detection of a laser light flash of the first predetermined color. The controller is further configured to activate the at least one second light source and to cause the cockpit ambient light control circuit to turn off or dim the intensity output of the cockpit ambient lighting upon detection of a laser light flash of the second predetermined color.

In a third aspect, a method for minimizing effects of a laser light flash in a cockpit area of an aircraft is provided. A laser light flash of a predetermined color is detected using a sensor mounted adjacent to a windscreen for the cockpit area of the aircraft. Upon detection of the laser light flash of the predetermined color, at least one light source mounted in the cockpit area and configured to output light of the predetermined color is activated and an intensity output of cockpit ambient lighting is turned off or dimmed. In a further embodiment, each backlighting element in each flight deck instrument is caused to operate at an increased intensity output level upon the detection of the laser light flash of the predetermined color.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Laser devices, such as laser pointers, are currently available in a number of different colors (wavelengths), including red (~650 nm), red-yellow (~635 nm), yellow (~590 nm), green (~520 nm), blue (~473 nm), and violet (~405 nm). The human eye is most sensitive to green laser light and aircraft pilots report cockpit illumination events for green laser much more often than other colors of laser light. The system and method disclosed herein addresses the problem of laser light illumination of the cockpit/flight deck and minimizes the effects caused by glare and distraction resulting from such laser light illumination, thereby minimizing any annoyance and interference with crewmember duties during flight operations caused by such glare and distraction.

Figure 1:
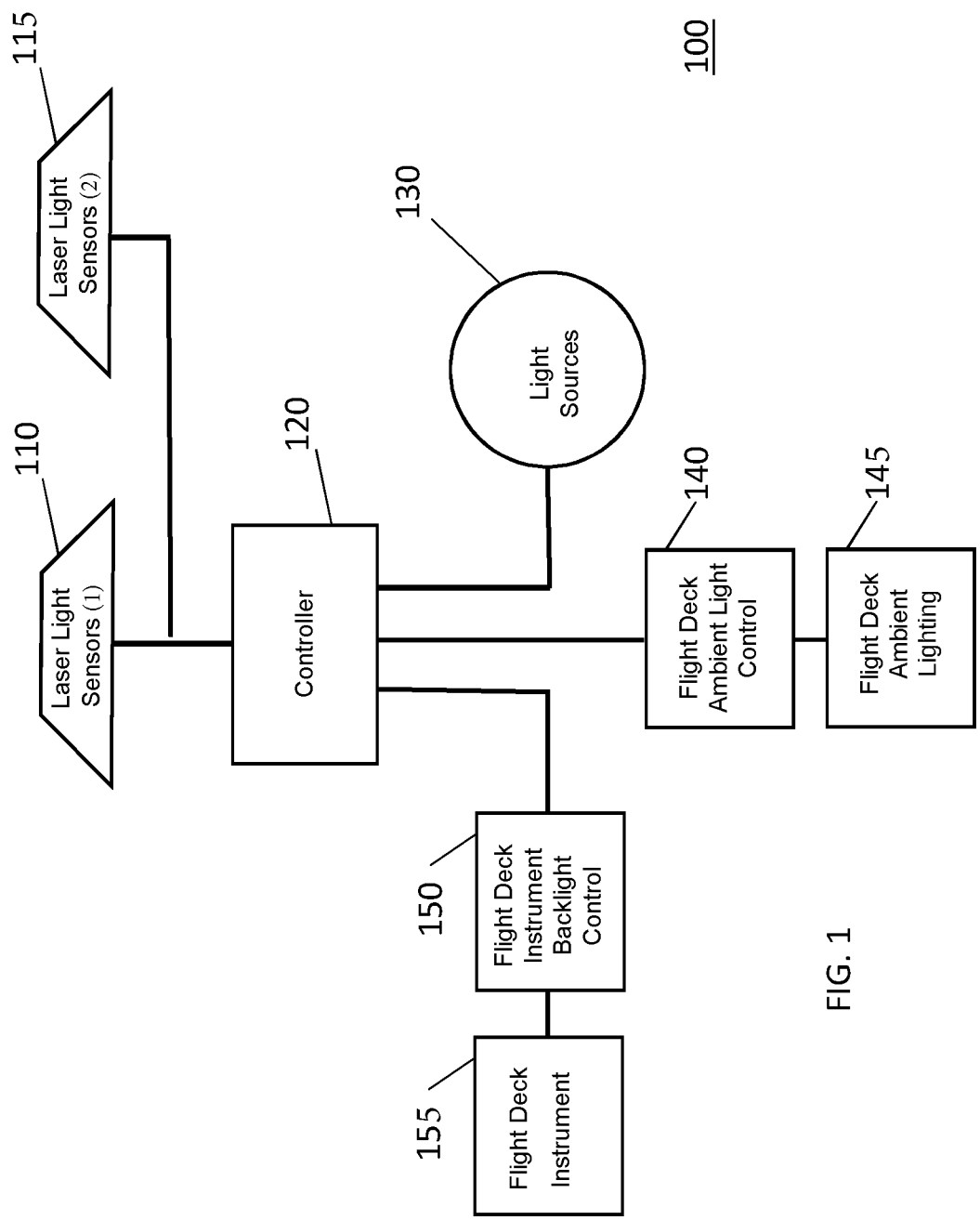
FIG. 1 is a block diagram of a flight deck laser light mitigation system according to the present disclosure.

Referring now to FIG. 1, the system 100 disclosed herein employs one or more laser light sensors 110, 115 mounted adjacent to the cockpit windscreens in an aircraft. Preferably, the sensors 110, 115 are mounted to allow detection of laser light received via both side and front quarters of the cockpit windscreens on the aircraft. The laser light sensors 110, 115 are coupled to a controller 120, which in turn is coupled to one or more light sources 130 and to flight deck ambient light control circuit 140 which controls the flight deck ambient lighting 145. Each of the light sources 130 is mounted on the flight deck and is selectively activated by controller 120 when a laser light flash is detected by laser light sensors 110, 115. At the same time controller 120, via the connection to the flight deck ambient light control circuit 140, turns off or dims the initial output intensity of flight deck ambient lighting. For example, controller 120 may dim the flight deck ambient lighting by causing the flight deck ambient lighting to have a much lower output intensity than the normal operating level (i.e., the initial output intensity). This much lower output intensity may be a fraction of the initial output intensity, e.g., one-fifth of the normal output intensity. In one embodiment, the light sensors 110 are configured to detect laser light flashes having a particular color, e.g., green, the light sensors 115 are omitted, and each of the light sources 130 outputs light having the same detected color. This allows a system to be configured to address the color of laser light mostly commonly reported by pilots. By immediately switching the lighting in the cockpit to the same color as the detected laser light flash for a predetermined period of time, the level of disorientation and disruption to the flight crew on the flight deck can be greatly mitigated. By reducing the output intensity of the flight deck ambient lighting and activating light sources 130, the light sources 130 become the predominant source of light on the flight deck. This reduces any disorientation of the flight crew of laser light flashes and reduces glare caused by such flashes (and any disorientation caused by such glare).

An aircraft cockpit includes numerous flight deck instruments for use by crewmembers during flight. The flight deck instruments include backlighting elements that ensure that the output of each flight deck instrument can be viewed in dark or low light conditions. The intensity output of the backlighting elements for each of the flight deck instruments is typically set to an initial level by a common control circuit. In a further embodiment, controller 120 is also coupled to a flight deck instrument backlight element control circuit 150 (and corresponding flight deck instrument 155 including a backlight element) and is configured to cause the intensity output of the backlighting elements of the flight deck instruments to increase upon detection of a laser light flash by laser light sensors 110, 115. This further mitigates any effects caused by the externally sourced laser light by providing higher instrument light intensity to compensate for the temporary loss of night (low light) vision. Controller 120 is also configured to return the intensity output of the backlighting elements of the flight deck instruments to a normal level gradually after the predetermined time period.

In another embodiment, the laser light sensors 110, 115 are configured to detect both the occurrence of a laser light flash and the color of such laser light flash, and the light sources 130 are controllable to output a number of different colors of light under the control of controller 120, with the actual output color for light source 130 selected to match the color detected by laser light sensors 110, 115, respectively. This may be done, for example, by having separate sensors 110, 115 etc. corresponding to each possible color of laser light flash (i.e., red, red-yellow, yellow, green, blue, and violet). In some cases, sensors 110, 115 may be selected to detect only a subset of the possible laser light colors, e.g., only those colors that are considered distracting to the flight crew. The light sources 130 are configured to output each possible color detectable by sensors 110, 115 (or separate light sources 130 are provided for each possible color detectable by sensors 110). Controller 120 is configured to cause each of the light sources 130 to activate with a light color output selected to match the color of the laser light flash detected on the flight deck, based on the output of sensors 110, 115. This embodiment provides additional protection against laser light flashes of different colors. Controller 120 causes each light source 130 to automatically fade and turn off after a predetermined period of time following the last sensing of the laser source(s) by the sensors 110, 115 (e.g., 15-20 seconds). As discussed with respect to FIG. 2, each time an additional laser light flash is detected by sensors 110, 115, the time period for activating light sources 130 is extended to ensure that light sources 130 remain active for the entire period during which laser light flashes occur in the cockpit. Controller 120 also causes the flight deck ambient lighting to return to normal levels via flight deck ambient light control circuit 140 after this same predetermined time period. This minimizes any night vision loss while allowing ordinary flight operations to continue. This system, when installed within an aircraft cockpit, mitigates the harmful effects of laser light glare, reflection, and distraction on the flight deck that is caused by flashing and reflected externally sourced laser light in the cockpit.

By mitigating the effects of the laser light flash, system 100 allows an aircrew on the flight deck to focus on flying the aircraft with a greatly reduced level of distraction. When sensors 110, 115 no longer sense any laser light, system 100 automatically fades out light sources 130 and gradually returns instrument backlighting elements to normal levels over a period of time that allows the vision of the aircrew to easily readjust to the night environment.

Figure 2:
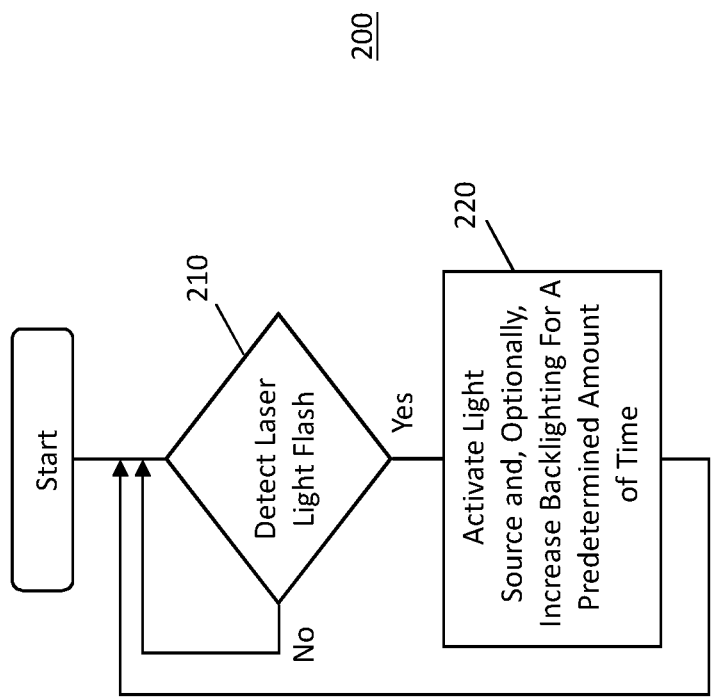
FIG. 2 is a flow chart of a flight deck laser light mitigation method according to the present disclosure.

Referring now to FIG. 2, a flowchart 200 shows the operation of the method of the instant disclosure. In particular, a laser light flash is detected at step 210 by the laser light sensors 110, 115 in FIG. 1. Laser light sensors 110, 115 may be configured to detect laser light of a particular, e.g., green, color or may be configured to detect laser light of a plurality of colors, as discussed above. When a laser light flash is detected, processing moves to step 220, where one or more light sources, e.g., laser light sources 130 in FIG. 1, are activated within the cockpit for a predetermined period of time, each of the light sources having an output color of light corresponding to the color of light detected by laser light sensors 110, 115 and the ambient flight deck lighting is dimmed or turned off. In addition, the intensity output of backlighting elements of flight deck instruments may optionally be increased at step 220 to minimize any distraction caused by the laser light flash for this same predetermined time period. After step 220, processing returns to step 210 to detect the next occurrence of a laser light flash. Thus, each time a laser light flash is detected, the time period for activating light sources 130 and dimming the ambient flight deck lighting is reset to the full predetermined time period, ensuring that the light sources 130 remain active for the duration of a laser light flash event.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for minimizing effects of a laser light flash in a cockpit area of an aircraft, comprising:
   at least one sensor configured to detect a laser light flash of a predetermined color;
   at least one light source mounted in the cockpit area and configured to output light of the predetermined color upon activation; and
   a controller coupled to the at least one sensor, the at least one light source, and a cockpit ambient light control circuit, the cockpit ambient light control circuit configured to control an intensity output of cockpit ambient lighting, the controller configured to activate the at least one light source and to cause the cockpit ambient light control circuit to turn off or dim the intensity output of the cockpit ambient lighting upon detection of a laser light flash of the predetermined color.

2. The system of claim 1, wherein the controller is further configured to deactivate the at least one light source and to return the cockpit ambient lighting to a normal level after a predetermined period of time following the detection of the laser light flash by the at least one sensor.

3. The system of claim 1, wherein the cockpit area of the aircraft includes at least one flight deck instrument having a backlighting element operating at an initial intensity output level and wherein the controller is also coupled to a flight deck instrument backlight element control circuit and is configured to cause the backlighting element to operate at an increased intensity output level upon the detection of the laser light flash of the predetermined color.

4. The system of claim 3, wherein the controller is further configured to cause the backlighting element to return to the initial intensity output level after a predetermined period of time after the detection of the laser light flash of the predetermined color.

5. The system of claim 1, wherein the predetermined color is green.

6. The system of claim 1, wherein the intensity output of cockpit ambient lighting has an initial output intensity level, and wherein controller is further configured to dim the intensity output of the cockpit ambient lighting by causing the intensity output of the cockpit ambient lighting to be a fraction of the initial output intensity level.

7. The system of claim 6, wherein the fraction is one-fifth.

8. The system of claim 1, wherein each of the at least one sensors is mounted adjacent to cockpit windscreens in the aircraft.

9. A system for minimizing effects of a laser light flash in a cockpit area of an aircraft, comprising:
   at least one first sensor configured to detect a laser light flash of a first predetermined color;
   at least one second sensor configured to detect a laser light flash of a second predetermined color;
   at least one first light source mounted in the cockpit area and configured to output light of the first predetermined color upon activation;
   at least one second light source mounted in the cockpit area and configured to output light of the second predetermined color upon activation; and
   a controller coupled to the at least one first sensor, the at least one second sensor, the at least one first light source and the at least one second light source, and a cockpit ambient light control circuit, the cockpit ambient light control circuit configured to control an intensity output of cockpit ambient lighting, the controller configured to activate the at least one first light source and to cause the cockpit ambient light control circuit to turn off or dim the intensity output of the cockpit ambient lighting upon detection of a laser light flash of the first predetermined color, the controller further configured to activate the at least one second light source and to cause the cockpit ambient light control circuit to turn off or dim the intensity output of the cockpit ambient lighting upon detection of a laser light flash of the second predetermined color.

10. The system of claim 9, wherein the controller is further configured to deactivate the at least one first light source and to return the cockpit ambient lighting to a normal level after a predetermined period of time following the detection of a laser light flash of the first predetermined color by the at least one first sensor.

11. The system of claim 9, wherein the controller is further configured to deactivate the at least one second light source and to return the cockpit ambient lighting to a normal level after a predetermined period of time following the detection of the laser light flash of the second predetermined color by the at least one second sensor.

12. The system of claim 9, wherein the cockpit area of the aircraft includes at least one flight deck instrument having a backlighting element operating at an initial intensity output level and wherein the controller is also coupled to a flight deck instrument backlight element control circuit and is configured to cause the backlighting element to operate at an increased intensity output level upon the detection of the laser light flash of the first predetermined color or upon detection of a laser light flash of the second predetermined color.

13. The system of claim 12, wherein the controller is further configured to cause the backlighting element to return to the initial intensity output level after a predetermined period of time after the detection of the laser light flash of the first predetermined color or after detection of the laser light flash of the second predetermined color.

14. The system of claim 9, wherein the first predetermined color is green.

15. The system of claim 14, wherein the second predetermined color is red.

16. The system of claim 9, wherein the intensity output of cockpit ambient lighting has an initial output intensity level, and wherein controller is further configured to dim the intensity output of the cockpit ambient lighting by causing the intensity output of the cockpit ambient lighting to be a fraction of the initial output intensity level.

17. The system of claim 16, wherein the fraction is one-fifth.

18. The system of claim 9, wherein each of the at least one first sensors and each of the at least one second sensors are mounted adjacent to cockpit windscreens in the aircraft.

19. A method for minimizing effects of a laser light flash in a cockpit area of an aircraft, comprising the steps of:
   detecting a laser light flash of a predetermined color using a sensor mounted adjacent to a windscreen for the cockpit area of the aircraft; and
   upon detection of the laser light flash of the predetermined color:
   activating at least one light source mounted in the cockpit area and configured to output light of the predetermined color; and
   turning off or dimming an intensity output of cockpit ambient lighting.

20. The method of claim 19, further comprising the step of causing each backlighting element in each flight deck instrument to operate at an increased intensity output level upon the detection of the laser light flash of the predetermined color.

* * * * *